US011330670B2

(12) United States Patent
Vesely et al.

(10) Patent No.: US 11,330,670 B2
(45) Date of Patent: *May 10, 2022

(54) FIRST RADIO NETWORK NODE (RNN), A SECOND RNN AND METHODS THEREIN FOR ESTABLISHING A COMMUNICATIONS INTERFACE BETWEEN THE FIRST RNN AND THE SECOND RNN

(71) Applicant: Telefonaktiebolaget LM Ericsson (publ), Stockholm (SE)

(72) Inventors: Alexander Vesely, Feldbach (AT); Angelo Centonza, Stockholm (SE); Markus Drevö, Linköping (SE); Elena Myhre, Järfälla (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 14 days.

This patent is subject to a terminal disclaimer.

(21) Appl. No.: 16/893,792

(22) Filed: Jun. 5, 2020

(65) Prior Publication Data
US 2020/0305235 A1 Sep. 24, 2020

Related U.S. Application Data

(63) Continuation of application No. 15/773,606, filed as application No. PCT/SE2018/050281 on Mar. 20, 2018, now Pat. No. 10,716,169.
(Continued)

(51) Int. Cl.
H04W 4/00 (2018.01)
H04W 92/20 (2009.01)
(Continued)

(52) U.S. Cl.
CPC ............. *H04W 92/20* (2013.01); *H04W 8/08* (2013.01); *H04W 24/02* (2013.01); *H04W 48/16* (2013.01); *H04W 76/11* (2018.02); *H04W 76/15* (2018.02)

(58) Field of Classification Search
CPC ..... H04W 80/04; H04W 88/06; H04W 88/08; H04W 28/04; H04W 72/04; H04W 72/0446; H04L 5/0007
(Continued)

(56) References Cited

U.S. PATENT DOCUMENTS 9,497,619 B2 11/2016 Godin
10,419,985 B2 9/2019 Kim et al.
(Continued)

FOREIGN PATENT DOCUMENTS

WO 2015046911 A1 4/2015
WO 2015066527 A1 5/2015

OTHER PUBLICATIONS

"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.
(Continued)

Primary Examiner — Chuong T Ho
(74) Attorney, Agent, or Firm — Sage Patent Group

(57) ABSTRACT

Embodiments include methods, performed by a first radio network node (RNN) in a wireless network, to establish a communications interface with a second RNN in the wireless network. Such methods include receiving, from a third RNN in the wireless network, a Transport Network Layer (TNL) address associated with the second RNN. The first and third RNNs are configured for wireless communication with wireless devices via an E-UTRA radio access technol-
(Continued)

ogy (RAT), and the second RNN is configured for wireless communication via an NR RAT. The third RNN can be a proxy node for discovery of TNL addresses associated with a plurality RNNs configured for wireless communication via the NR RAT. Such methods include establishing the communications interface with the second RNN based on the TNL address received from the third RNN. Other embodiments include complementary methods performed by a second RNN, and RNNs configured to perform such methods.

23 Claims, 5 Drawing Sheets

Related U.S. Application Data

(60) Provisional application No. 62/475,903, filed on Mar. 24, 2017.

(51) Int. Cl.
  *H04W 76/15* (2018.01)
  *H04W 76/11* (2018.01)
  *H04W 24/02* (2009.01)
  *H04W 8/08* (2009.01)
  *H04W 48/16* (2009.01)

(58) Field of Classification Search
  USPC .......................................... 370/329, 330, 328
  See application file for complete search history.

(56) References Cited

U.S. PATENT DOCUMENTS

| | | | |
|---|---|---|---|
| 2013/0137434 A1 | 5/2013 | Godin | |
| 2013/0322390 A1* | 12/2013 | Xu | H04W 92/20 370/329 |
| 2015/0124702 A1 | 5/2015 | Ozturk et al. | |
| 2016/0212775 A1* | 7/2016 | Xu | H04W 76/10 |
| 2018/0035334 A1 | 2/2018 | Lohar et al. | |
| 2018/0049098 A1 | 2/2018 | Ueda | |
| 2018/0115928 A1 | 4/2018 | Kim et al. | |
| 2018/0227919 A1* | 8/2018 | Lee | H04W 72/0453 |
| 2018/0270743 A1* | 9/2018 | Callard | H04L 45/64 |
| 2019/0068331 A1* | 2/2019 | Lee | H04L 1/18 |

OTHER PUBLICATIONS

"3GPP TR 38.801 V2.0.0", 3rd Generation Partnership Project; Technical Specification Group Radio Access Network; Study on New Radio Access Technology; Radio Access Architecture and Interfaces (Release 14), Mar. 2017, pp. 1-90.
"3GPP TS 36.300 V14.2.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), Mar. 2017, pp. 1-330.
"3GPP TS 36.420 V14.0.1", 3rd Generation Partnership Project; Technical Specification Group Radio Access Network; Evolved Universal Terrestrial Radio Access Network (E-UTRAN); X2 general aspects and principles (Release 14), Mar. 2017, pp. 1-13.
"3GPP TS 36.421 V14.0.0", 3rd Generation Partnership Project; Technical Specification Group Radio Access Network; Evolved Universal Terrestrial Radio Access Network (E-UTRAN); X2 layer 1 (Release 14), Mar. 2017, pp. 1-6.
"3GPP TS 36.422 V14.0.0", 3rd Generation Partnership Project; Technical Specification Group Radio Access Network; Evolved Universal Terrestrial Radio Access Network (E-UTRAN); X2 signalling transport (Release 14), Mar. 2017, pp. 1-8.
"3GPP TS 36.423 V14.2.0", 3rd Generation Partnership Project; Technical Specification Group Radio Access Network; Evolved Universal Terrestrial Radio Access Network (E-UTRAN); X2 application protocol (X2AP) (Release 14), Mar. 2017, pp. 1-242.
"3GPP TS 36.424 V14.0.0", 3rd Generation Partnership Project; Technical Specification Group Radio Access Network; Evolved Universal Terrestrial Radio Access Network (E-UTRAN); X2 data transport (Release 14), Mar. 2017, pp. 1-8.
"3GPP TS 36.425 V14.0.0", 3rd Generation Partnership Project; Technical Specification Group Radio Access Network; Evolved Universal Terrestrial Radio Access Network (E-UTRAN); X2 interface user plane protocol (Release 14), Mar. 2017, pp. 1-17.
"IEEE Standard for Low-Rate Wireless Networks", IEEE Std 802.15.4™—2015; IEEE Computer Society; New York, Mew York, Dec. 5, 2015, pp. 1-708.
"On X2 TNL Address discovery for option 3", 3GPP TSG-RAN WG3 Meeting #97bis; R3-173935; Prague, Czech Republic, Oct. 9-13, 2017, pp. 1-10.
"Several Types of Uplink Reference Signal Sequence", 3GPP TSG RAN WG1 #47bis; R1-070234; Sorrento, Italy, Jan. 15-19, 2007, pp. 1-4.
"TNL address discovery for Xx interface establishment", 3GPP TSG RAN WG3 Meeting #95; R3-170423; Athens, Greece, Feb. 13-17, 2017, pp. 1-3.
"TNL address discovery in Option 3/3a/3x", 3GPP TSG-RAN WG3 #97; R3-173010; Berlin, Germany, Aug. 21-25, 2017, pp. 1-2.

* cited by examiner

Fig. 3 Method performed by first radio network node 208

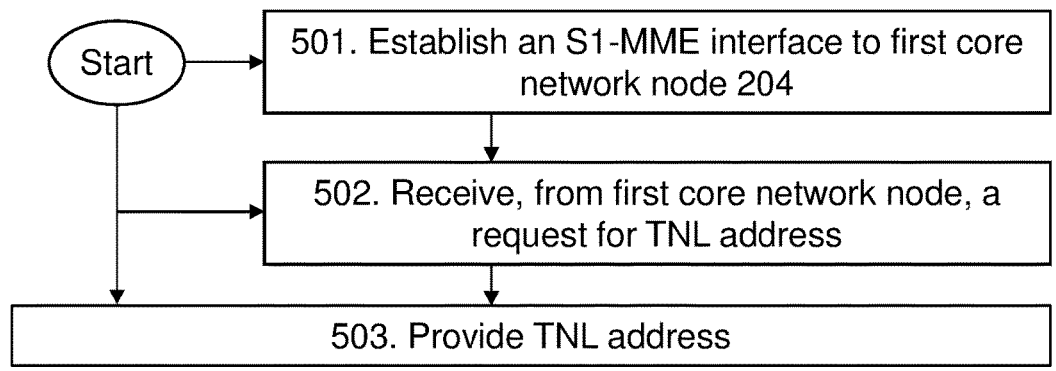
Fig. 5 Method performed by second radio network node 210
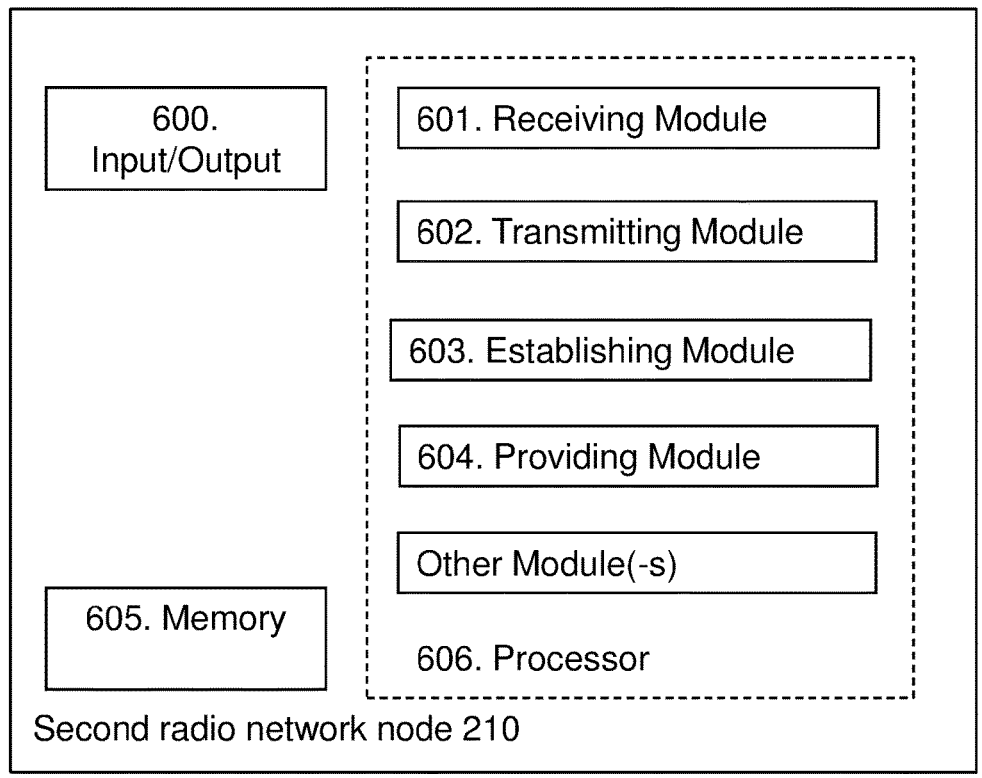
Fig. 6

FIRST RADIO NETWORK NODE (RNN), A SECOND RNN AND METHODS THEREIN FOR ESTABLISHING A COMMUNICATIONS INTERFACE BETWEEN THE FIRST RNN AND THE SECOND RNN

CROSS-REFERENCE TO RELATED APPLICATION(S)

This application is a continuation of, and claims the benefit of priority from, U.S. patent application Ser. No. 15/773,606 filed on May 4, 2018, which is a U.S. national-stage application claiming priority to international application PCT/SE2018/050281 filed on Mar. 20, 2018, which claims priority to U.S. Provisional Application No. 62/475,903 filed on Mar. 24, 2017. The entire disclosures of the above-mentioned applications are incorporated herein by reference for all purposes.

TECHNICAL FIELD

Embodiments herein relate to a first Radio Network Node (RNN), a second RNN and to methods therein. Especially, embodiments herein relate to establish a communications interface between the first RNN and the second RNN.

BACKGROUND

Communication devices such as terminals or wireless devices are also known as e.g. User Equipments (UEs), mobile terminals, wireless terminals and/or mobile stations. Such terminals are enabled to communicate wirelessly in a wireless communication system or a cellular communications network, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the wireless communications network.

The above terminals or wireless devices may further be referred to as mobile telephones, cellular telephones, laptops, or tablets with wireless capability, just to mention some further examples. The terminals or wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations communicate over the air interface operating on radio frequencies with the terminals or wireless devices within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

A Universal Mobile Telecommunications System (UMTS) is a third generation (3G) telecommunication network, which evolved from the second generation (2G) Global System for Mobile Communications (GSM) network. The UMTS Terrestrial Radio Access Network (UTRAN) is essentially a RAN using Wideband Code Division Multiple Access (WCDMA) and/or High Speed Packet Access (HSPA) for a user equipment. In a forum known as the Third Generation Partnership Project (3GPP), telecommunications suppliers propose and agree upon standards for the third generation networks, and investigate enhanced data rate and radio capacity. In some RANs, e.g. as in the UMTS, several radio network nodes may be connected, e.g., by landlines or microwave, to a controller node, such as a Radio Network Controller (RNC) or a Base Station Controller (BSC), which controller node supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3GPP and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

In the 3GPP LTE network, base stations, which may be referred to as eNodeBs or even eNBs, may be directly connected to one or more core networks.

The 3GPP LTE radio access standard has been written in order to support high bitrates and low latency both for uplink and downlink traffic. All data transmission is in LTE controlled by the radio base station.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO systems.

In the 4G communications network, the EPS, an Automatic Neighbour Relation (ANR) function and an X2-C Transport Network Layer (TNL) address discovery were introduced to allow the eNBs that have not yet setup an X2 interface between each other to do so. This may for example be the case when the eNB has determined that a neighbour eNB serves a cell suitable as a target cell for handover.

Exchange of addresses between the eNBs, e.g. exchange of the respective eNB's X2-C interface TNL signaling address, may be achieved by means of signaling via the core network, see 3GPP TS 36.300. Signaling between the eNBs via the core network is enabled due to the fact that each eNB has established a connection towards a Core Network (CN) node, e.g. an S1-MME interface instance towards a Mobility Management Entity (MME), for signaling purposes. Thereby, each eNB provides its node identity to the MME.

The TNL establishes physical and logical connections between the RAN and the CN, e.g. between a Radio Network Node (RNN) such as an eNB and a CN Node (CNN). The TNL comprises the transport network Control plane (C-plane) and the transport network User plane (U-plane).

An eNB node identity (ID) is derived from the 20 Most Significant Bits (MSBs) of the identities of the E-UTRA cells it serves. An E-UTRA cell ID is 28 bits long. However, it should be understood that the eNB identities may be constituted from less or more than the 20 MSBs of the identities of the E-UTRA cells, e.g. for Home eNBs or for eNBs with flexible eNB ID, as introduced in the 3GPP Release 14 (Rel-14).

An eNB detecting a cell of a neighbouring eNB suitable e.g. as a handover target, will request the UE reporting the cell to provide the E-UTRA cell identity. The neighbouring eNB identity may be derived from the E-UTRA cell identity.

If an eNB, e.g. a requesting eNB, wants to setup an X2 interface to a neighbour eNB serving a potential handover target cell, the requesting eNB provides its node identity to the CN node, e.g. the MME, by means of S1-MME signaling, e.g. by means of an eNB CONFIGURATION TRANSFER. Thereby, asking the MME to resolve the eNB identity of the node hosting the potential handover target and relay the request for providing the X2-C signaling address to the neighbour eNB. Once the requesting eNB has received the X2-C signaling address, the X2-C interface may be setup.

SUMMARY

An object addressed by embodiments herein is how to improve performance in a wireless communications network.

According to an aspect of embodiments herein, the object is achieved by a method performed by a first radio network node for establishing a communications interface between the first radio network node and a second radio network node. The first radio network node is configured to provide one or more E-UTRA resources and the second radio network node is configured to provide one or more NR resources. The first radio network node and the second radio network node are operating in a wireless communications network.

The first radio network node obtains an TNL address of the second radio network node from one out of: a first core network node operating in the wireless communications network and another first radio network node acting as a proxy node in the wireless communications network, wherein the another first radio network node is configured to provide one or more E-UTRA resources.

Further, the first radio network node establishes a communications interface between the first radio network node and the second radio network node based on the obtained TNL address.

According to another aspect of embodiments herein, the object is achieved by a first radio network node for establishing a communications interface between the first radio network node and a second radio network node. The first radio network node is configured to provide one or more E-UTRA resources and the second radio network node is configured to provide one or more NR resources. The first radio network node and the second radio network node are configured to operate in a wireless communications network.

The first radio network node is configured to obtain a TNL address of the second radio network node from one out of: a first core network node configured to operate in the wireless communications network and another first radio network node configured to act as a proxy node in the wireless communications network, wherein the another first radio network node is configured to provide one or more E-UTRA resources.

Further, the first radio network node is configured to establish a communications interface between the first radio network node and the second radio network node based on the obtained TNL address.

According to another aspect of embodiments herein, the object is achieved by a method performed by a second radio network node for providing its Transport Network Layer (TNL) address to a first radio network node to enable establishment of a communications interface between the first radio network node and the second radio network node. The first radio network node is configured to provide one or more E-UTRA resources and the second radio network node is configured to provide one or more NR resources. The first radio network node and the second radio network node are operating in a wireless communications network.

The second radio network node provides a TNL address to one out of: a first core network node operating in the wireless communications network and another first radio network node acting as a proxy node in the wireless communications network, wherein the another first radio network node is configured to provide one or more E-UTRA resources.

According to another aspect of embodiments herein, the object is achieved by a second radio network node for providing its Transport Network Layer (TNL) address to a first radio network node to enable establishment of a communications interface between the first radio network node and the second radio network node. The first radio network node is configured to provide one or more E-UTRA resources and the second radio network node is configured to provide one or more NR resources. The first radio network node and the second radio network node are configured to operate in a wireless communications network.

The second radio network node is configured to provide a TNL address to one out of: a first core network node configured to operate in the wireless communications network and another first radio network node configured to act as a proxy node in the wireless communications network, wherein the another first radio network node is configured to provide one or more E-UTRA resources.

According to another aspect of embodiments herein, the object is achieved by a computer program, comprising instructions which, when executed on at least one processor, causes the at least one processor to carry out the method performed by the first radio network node.

According to another aspect of embodiments herein, the object is achieved by a computer program, comprising instructions which, when executed on at least one processor, causes the at least one processor to carry out the method performed by the second radio network node.

According to another aspect of embodiments herein, the object is achieved by a carrier comprising the computer program, wherein the carrier is one of an electronic signal, an optical signal, a radio signal or a computer readable storage medium.

Since the first radio network node receives an TNL address of the second radio network node, the first radio network node is able to establish a communication interface between the first and second radio network nodes without requiring any preceding configuration of the second radio network node with the first radio network node's TNL address. This results in an improved performance in the wireless communications network.

An advantage with some embodiments disclosed herein is that they avoid or delimit tedious and error prone O&M configurations. An approach making use of traffic interfaces is also to be seen as enabling a more dynamic address discovery in line with the principles of a Self-Organizing Network (SON).

BRIEF DESCRIPTION OF DRAWINGS

Examples of embodiments herein will be described in more detail with reference to attached drawings in which:

FIG. 5 is a flowchart depicting embodiments of a method performed by a second radio network node; and FIG. 6 is a schematic block diagram illustrating embodiments of a second radio network node.

DETAILED DESCRIPTION

As part of developing embodiments herein, some drawbacks with the state of the art communications networks will first be identified and discussed.

For the 5G communications network, a connectivity option is about to be specified which foresees dual connectivity between a first radio network node, e.g. a node providing E-UTRA resources such as an LTE eNB, and a second radio network node, e.g. a node providing New Radio (NR) resources such as a next generation Node B (gNB). This connectivity option is called "option 3", as per the 3GPP TR 38.801 specification and foresees connectivity from RAN nodes towards a 4G Core Network by means of the S1 interface. The connectivity option "option 3" may also be referred to as an E-UTRAN-NR Dual Connectivity (EN-DC). While the 3GPP TR 38.801 specification calls the interface between the first radio network node, e.g. the LTE eNB, and the second radio network node, e.g. the gNB, "Xx", it is quite likely that such an interface is specified within the existing specifications of the X2 interface, i.e. with the 3GPP 36.42x series. Thus, the expressions "Xx interface", "Xx address" and similar should not be construed limiting but to refer or relate to an interface between two radio network nodes.

Figure 1A:
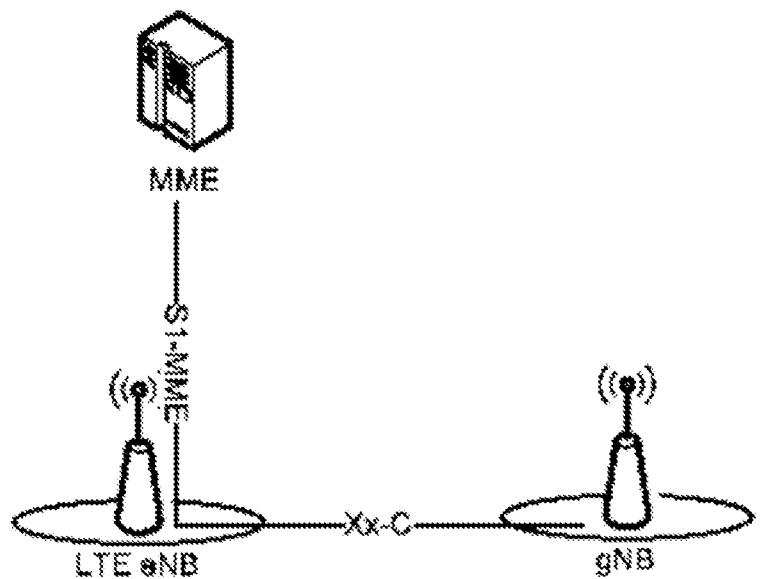
FIGS. 1A and 1B schematically illustrate C-plane connectivity and U-plane connectivity, respectively, for Option 3/3a/3x.
Figure 1B:
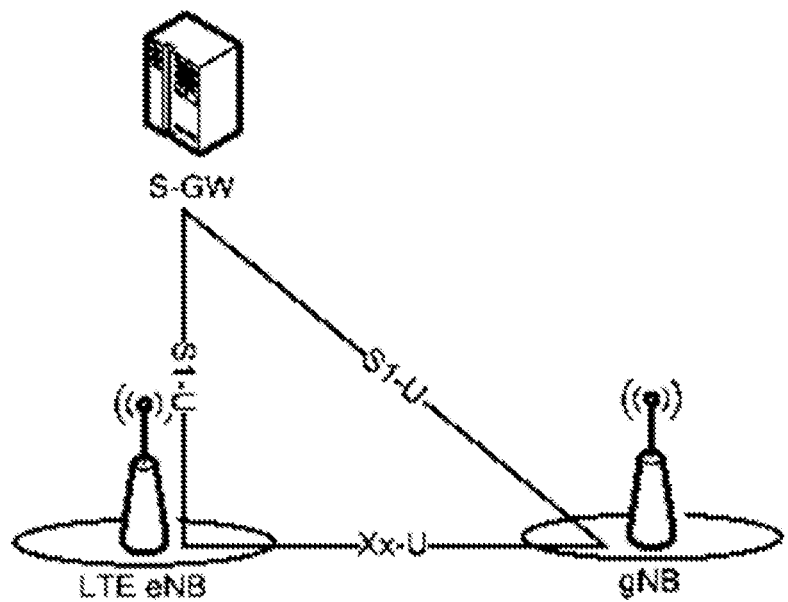

FIGS. 1A and 1B schematically illustrate C-plane connectivity and U-plane connectivity, respectively, in a communications network. In FIG. 1A, an S1-MME interface is provided between the LTE eNB and the MME, and an XX-C interface is provided between the LTE eNB and the gNB. However, as illustrated in FIG. 1A there is no C-plane connectivity from the second radio network node, e.g. the gNB, to the MME, only a U-plane connectivity is foreseen to a Serving GateWay (S-GW) as illustrated in FIG. 1B. Therefore, for option 3 it is not obvious how to execute TNL address discovery, e.g. Xx-C TNL address discovery, of the second radio network node, e.g. the gNB. FIG. 1B further illustrates a respective S1-U interface to the S-GW from the LTE eNB and the gNB, respectively, and an Xx-U interface between the LTE eNB and the gNB.

Without an S1-MME connectivity for the gNBs the only solution for setting up an Xx-C interface between the first radio network node and the second radio network node is during an Operation and Maintenance (O&M) procedure, i.e. by configuring all potential second radio network nodes, e.g. gNB neighbours, of the first radio network node, e.g. the LTE eNB, with the LTE eNB's Xx-C TNL address as depicted above. However, configuration is always a tedious and error prone method, and this is the reason why ANR and TNL address discovery were introduced in 4G. A solution is needed also for option 3.

An aim of some embodiments disclosed herein is to overcome or mitigate at least some of the drawbacks with the prior art.

Therefore, some embodiments disclosed herein relate to how the TNL address discovery of one or more second radio network nodes, e.g. gNBs, in the 5G connectivity option 3 may be performed if the respective one of the one or more second radio network nodes has not a fully operable S1-MME and/or has not a fully operable 5G CN interface instance established to the EPC/5G CN. Further, some embodiments herein relate to the establishment of a communications interface between a first radio network node, e.g. an LTE eNB, and the second radio network node, e.g. the NR gNB, based on an obtained TNL address of the second radio network node.

Some embodiments disclosed herein proposes an S1-MME connectivity between the second radio network node, e.g. the NR node such as the gNB, and a first core network node e.g. an MME or an MME pool, to which first core network node the corresponding first radio network node, e.g. the E-UTRA node such as the LTE eNB, is connected to. Only a subset of the S1-MME procedures may be operated on the S1-MME interface instance between the second radio network node, e.g. the gNB, and the corresponding first core network node e.g. the corresponding MME.

There is also some alternative embodiments described, wherein one or more first radio network nodes, e.g. one or more LTE eNBs, serve as one or more proxy nodes.

Another alternative is to build upon connectivity of the second radio network node, e.g. the NR node, to the first core network node, e.g. the MME, via the 5G CN and allow an inter-system address discovery.

Note that although terminology from LTE is used in this disclosure to exemplify the embodiments herein, this should not be seen as limiting the scope of the embodiments herein to only the aforementioned system. Other wireless systems, such as for example a NR network, 5G network, an LTE network, a Wideband Code Division Multiple Access (WCDMA) network, a Global System for Mobile Communications (GSM) network, any 3GPP cellular network, a Worldwide Interoperability for Microwave Access (WiMAX) network, a Wireless Local Area Network (WLAN), a Low Rate Wireless Personal Access Network (LR-WPAN) as defined in e.g. IEEE 802.15.4, a Bluetooth network, a SIGFOX network, a Zigbee network, a Bluetooth Low Energy (BLE) network such as a Bluetooth Smart network, or a Cellular Internet of Things (CIoT) network such as an Enhanced Coverage GSM-IoT (EC-GSM-IoT) network, a Narrow Band IoT (NB-IoT) network or a network comprising one or more wireless devices configured for Machine Type Communication (MTC) sometimes herein referred to as an eMTC network, may also benefit from exploiting the ideas covered within this disclosure.

Also note that terminology such as gNB, eNodeB and UE should be considering non-limiting and does in particular not imply a certain hierarchical relation between the two; in general "eNodeB" could be considered as device 1 and "UE" device 2, and these two devices communicate with each other over some radio channel.

Further, the description frequently refers to wireless transmissions in the downlink, but embodiments herein are equally applicable in the uplink.

In the following section, embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Some exemplifying embodiments will now be described in more detail.

Figure 2:
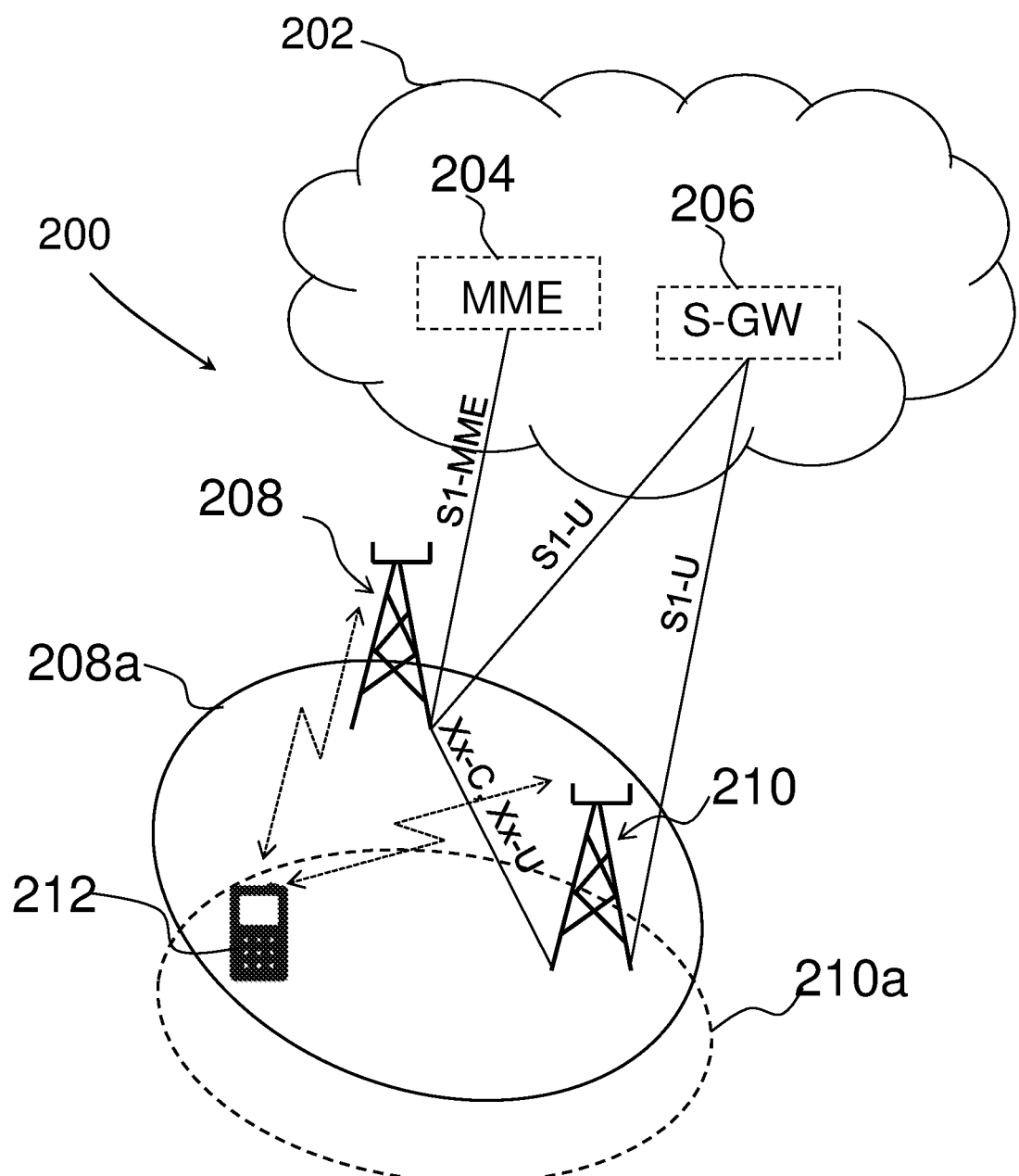
FIG. 2 schematically illustrates embodiments of a wireless communications network.

FIG. 2 depicts an example of the wireless communications network 200 in which embodiments herein may be implemented. The wireless communications network 200 may be a cellular communications network such as a NR network, a 5G network, an LTE network, a WCDMA network, a GSM network, any 3GPP cellular network, or a short range communications network, such as a WLAN, an LR-WPAN, a Bluetooth network, WiMAX network, a SIGFOX network, a Zigbee network, a BLE network such as a Bluetooth Smart network, or a CIoT network such as an EC-GSM-IoT network, a NB-IoT network or an eMTC network, or a combination of one or more of the aforementioned communications networks just to mention some examples. For example, the wireless communications network 200 may comprise a first communications network of a first Radio Access Technology (RAT), such as an E-UTRAN, i.e. an LTE network, and a second communication network of a second RAT such as a NR network. Such a combined E-UTRAN and NR communications network provides dual connectivity in that it provides connectivity by means of both the E-UTRAN network and the NR network.

A Core Network (CN) 202 may be comprised in the communications network 200 The core network 202 may be an NR core network, a 5G core network, an LTE core network, a WCDMA core network, a GSM core network, any 3GPP cellular core network, or a short range communications core network, such as a WLAN core network, an LR-WPAN core network, a Bluetooth core network, WiMAX core network, a SIGFOX core network, a Zigbee core network, a BLE core network such as a Bluetooth Smart network, or a CIoT network such as an EC-GSM-IoT core network, a NB-IoT core network or an eMTC core network, or a combination of one or more of the aforementioned communications core networks just to mention some examples. For example, the core network 202 may comprise a first core network of the first RAT, such as an EPC, i.e. an LTE core network, and a second core network of the second RAT such as a NR core network.

A first Core Network Node (CNN) 204 may be comprised in or arranged in communication with the core network 202. The first core network node 204 may be a Mobility Management Entity (MME). However, the first core network node 204 may also be an Authentication and Mobility Function (AMF). Thus, even if the first core network node 204 sometimes is referred to as an MME it should be understood that it may also be an AMF or a similar function or node. Further, a reference to an MME interface may be interpreted as a reference to an AMF interface in case the first core network node 204 is an AMF.

A second core network node 206 may be comprised in or arranged in communication with the core network 202. The second core network node 206 may be a Serving GateWay (S-GW). However, the second core network node 206 may also be a User Plane Function (UPF) or a similar function or node. Further, a reference to a S-GW interface may be interpreted as a reference to an UPF interface in case the second core network node 206 is an UPF.

A first Radio Network Node (RNN) 208 is arranged and configured to operate in the communication network 200. The first radio network node 208 is configured for wireless communication with wireless devices, such as a wireless device 212, when they are located within a first coverage area 208a, e.g. a geographical area served by the first radio network node 208. It should be understood that the first radio network node 208 may serve or manage a plurality of first coverage areas 208a, even though only one is illustrated in FIG. 2 for clarity reasons. The one more first coverage areas 208a are sometimes in this disclosure referred to as one or more first cells 208a.

It should be understood that one or more further first radio network nodes 208 may be operating in the communications network 200 even if only one first radio network node 208 is illustrated in FIG. 2.

The first radio network node 208 may be a transmission point such as a radio base station, for example an E-UTRA node, an LTE eNB, an eNB, an eNodeB, or a Home Node B, a Home eNode B or any other network node providing one or more E-UTRA resources and being capable to serve a wireless device in a communications network, such as the communications network 200. The first radio network node 208 may further be configured to communicate with the first and/or second core network node 204, 206.

A second Radio Network Node (RNN) 210 is arranged and configured to operate in the communication network 200. The second radio network node 210 is configured for wireless communication with wireless devices, such as the wireless device 212, when they are located within a second coverage area 210a, e.g. a geographical area served by the second radio network node 210. It should be understood that the second radio network node 210 may serve or manage a plurality of second coverage areas 210a, even though only one is illustrated in FIG. 2 for clarity reasons. The one more second coverage areas 210a are sometimes in this disclosure referred to as one or more second cells 210a.

The second radio network node 210 may be a transmission point such as a radio base station, for example a NR node, a gNB or any other network node providing one or more NR resources and being capable to serve a wireless device in a communications network, such as the communications network 200. The second radio network node 210 may further be configured to communicate with the first and/or second core network node 204, 206.

A wireless device 212 is operating in the wireless communications network 200. The wireless device 212, also sometimes referred to as a wireless communications device, a user equipment, a UE, a mobile station or a Mobile Station (MS), may be located in the wireless communications network 200. For example, the wireless device 212 may be an Internet of Things (IoT) device, a user equipment, a mobile terminal or a wireless terminal, a mobile phone, a computer such as e.g. a laptop, a Personal Digital Assistants (PDAs) or a tablet computer, with wireless capability, or any other radio network units capable to communicate over a radio link in a wireless communications network. It should be noted that the term user equipment used in this document also covers other wireless devices such as Machine to Machine (M2M) devices, even though they are not handled by any user. In some embodiments, the wireless device 212 is a stationary wireless device. Thus, the wireless device 212 is sometimes in this disclosure referred to as a stationary wireless device 212. By the expression "stationary wireless device" when used herein is meant that the wireless device 212 is not moving. For example, the stationary wireless device is not moving when in use, e.g. during operation.

Figure 3:
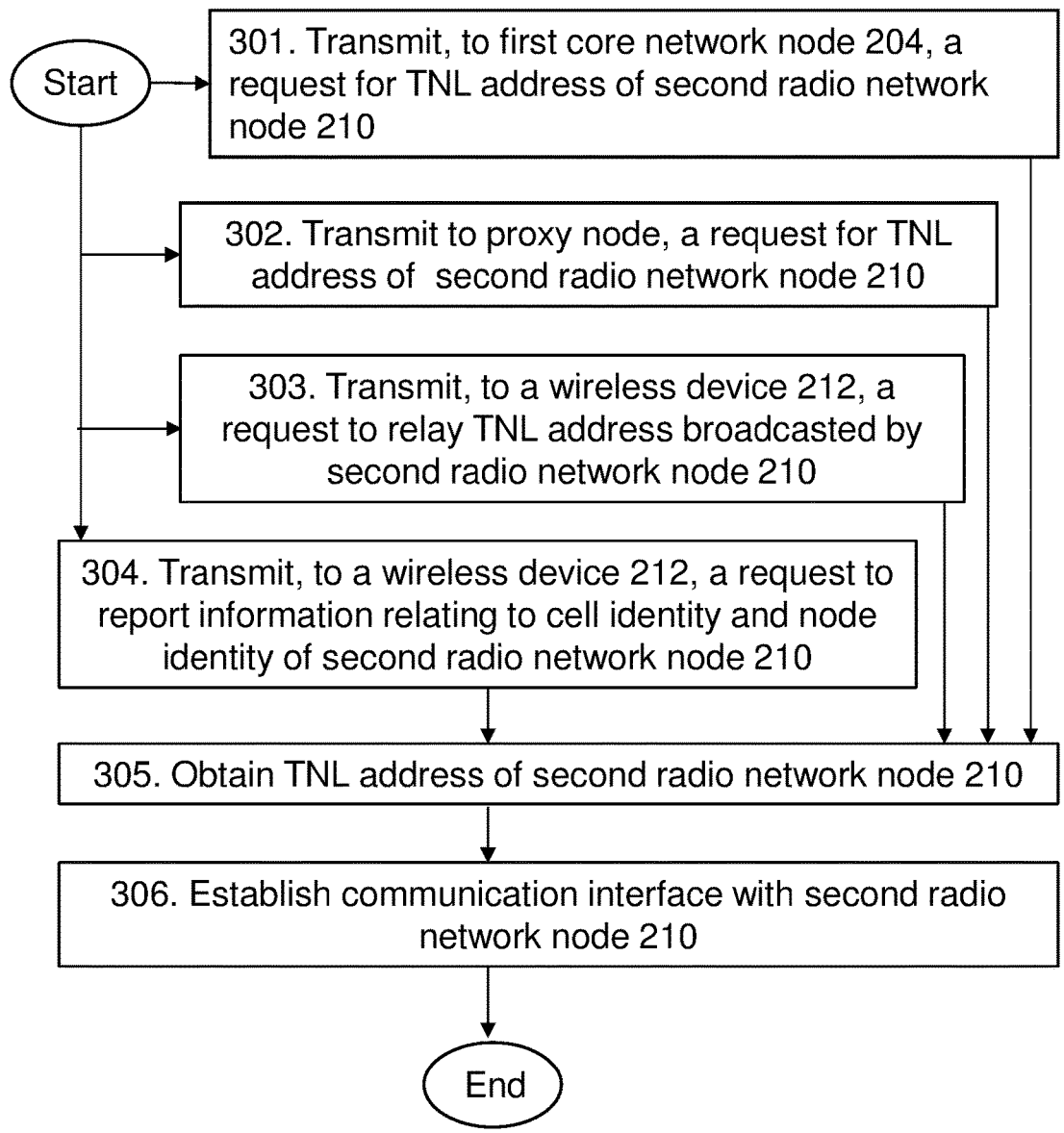
FIG. 3 is a flowchart depicting embodiments of a method performed by a first radio network node.

An example of a method performed by the first radio network node 208 for establishing a communications interface between the first radio network node 208 and the second radio network node 210 will now be described with reference to a flowchart depicted in FIG. 3. The first radio network node is configured to provide one or more E-UTRA resources and the second radio network node is configured to provide one or more NR resources. The second radio network node 210 may be a gNB and thus is lacking a control plane connectivity to the first core network node 204. As mentioned above, the first radio network node 208 and the second radio network node 210 operate in the wireless communications network 200.

In some embodiments, a node identifier of the second radio network node 210 is different from a node identifier of the first radio network node 208.

The node identifier of the second radio network node 210 may be derived from a NR cell identifier and the node identifier of the first radio network node 208 may be derived from an E-UTRA cell identifier.

The methods comprise one or more of the following actions. Thus, one or more of the following actions may be optional. Further, it should be understood that the actions may be taken in any suitable order and that some actions may be combined.

Action 301

In some embodiments, the first radio network node 208 transmits, to a first core network node 204 operating in the wireless communications network 200, a request for the TNL address of the second radio network node 210. The second radio network node 210 may have a communications interface to the first core network node 304. The communications interface may be an S1-MME interface or an AMF interface. This may relate to a first exemplifying approach that will be described in more detail below, wherein the second network node 210 lacking a control plane connectivity to the first core network node 204 has established a control plane connectivity to the first core network node 204. For example, this may be the case when the second network node 210 is a gNB which lacks a control plane connectivity and when the gNB has been configured to establish a control plane connectivity to the first core network node 204. The configuration of the gNB may take place before the request for the TNL address of the second radio network node 210 is transmitted.

In some embodiments, the first network node 208 transmits the request for the TNL address of the second radio network node 210 to the first core network node 204 via an inter-Core Network-inter-system (inter-CN-inter-system) interface. This may relate to a third exemplifying approach that will be described in more detail below.

Action 302

In some embodiments, the first radio network node 208 transmits, to another first radio network node 208 acting as a proxy node in the wireless communications network 200, a request for the TNL address of the second radio network node 210. This may relate to a second exemplifying approach that will be described in more detail below. The another first radio network node 208 may sometimes in this disclosure be referred to as a second first radio network node 208. In such cases, the first radio network node 208 may be referred to as a first first radio network node 208. Further, the another first radio network node 208 is configured to provide one or more E-UTRA resources.

Action 303

In some embodiments, the first radio network node 208 transmits, to a wireless device 212 operating in the communications network 200 and being served by the first radio network node 208, a request to relay a TNL address being broadcasted by the second radio network node 210. This may relate to a fourth exemplifying approach that will be described in more detailed below.

Action 304

In some embodiments, the first radio network node 208 transmits, to a wireless device 212 operating in the communications network 200 and being served by the first radio network node 208, a request to report information relating to a cell identity and a node identity of the second radio network node 210. This may relate to a fifth exemplifying approach that will be described in more detailed below.

Action 305

The first radio network node 208 obtains the TNL address of the second radio network node 210.

In some embodiments, the first radio network node 208 receives the TNL address of the second radio network node 210 from the first core network node 204. This may be the case when the first radio network node 208 has transmitted the request for the TNL address of the second radio network node 210 to the first core network node 204 as described in Action 301. Thus, this may relate to the first exemplifying approach that will be described below.

In some embodiments, the first radio network node 208 receives the TNL address of the second radio network node 210 from another first radio network node 208 acting as a proxy node in the wireless communications network 200. This may be the case when the first radio network node 208 has transmitted the request for the TNL address to another first radio network node 208 as described in Action 302 above. Thus, this may relate to the second exemplifying approach that will be described below.

In some embodiments, the first radio network node 208 receives the TNL address of the second radio network node 210 from one out of the first core network node 204 and a second core network node 206. This may relate to a third exemplifying approach that will be described below.

In some embodiments, the first radio network node 208 receives from the wireless device 212, the broadcasted TNL address of the second radio network node 210. This may be the case when the first radio network node 208 has transmitted, to the wireless device 212 operating in the communications network 200 and being served by the first radio network node 208, the request to relay a TNL address being broadcasted by the second radio network node 210 as described in Action 303 above. Thus, this may relate to the fourth exemplifying approach that will be described below.

In some embodiments, the first radio network node 208 receives from the wireless device 212, information relating to a cell identity and a node identity of the second radio network node 210. This may be the case when the first radio network node 208 has transmitted, to the wireless device 212 operating in the communications network 200 and being served by the first radio network node 208, the request to report information relating to the cell identity and the node identity of the second radio network node 210 as described in Action 304 above. Thus, this may relate to the fifth exemplifying approach that will be described below. In such embodiments, the first radio network node 208 determines, based on the received information, the TNL address of the second radio network node 210.

Action 306

In some embodiments, the first radio network node 208 establishes a communication interface, e.g. an Xx-C interface, between the first and second radio network nodes 208, 210. This may be done based on the received TNL address. Thereby, a connectivity between the first radio network node 208 providing E-UTRA resources and the second radio network node 210 providing NR resources is established. Thus, the communications interface enables direct communication between the first radio network node 208 and the second radio network node 210. As previously mentioned, a reference a an "Xx interface", "Xx address" and similar should not be construed limiting but to refer or relate to an interface between two radio network nodes, e.g. between the first and second radio network nodes 208, 210. It should also be understood that the expression X2-C interface may be used instead of Xx-C interface.

Figure 4:
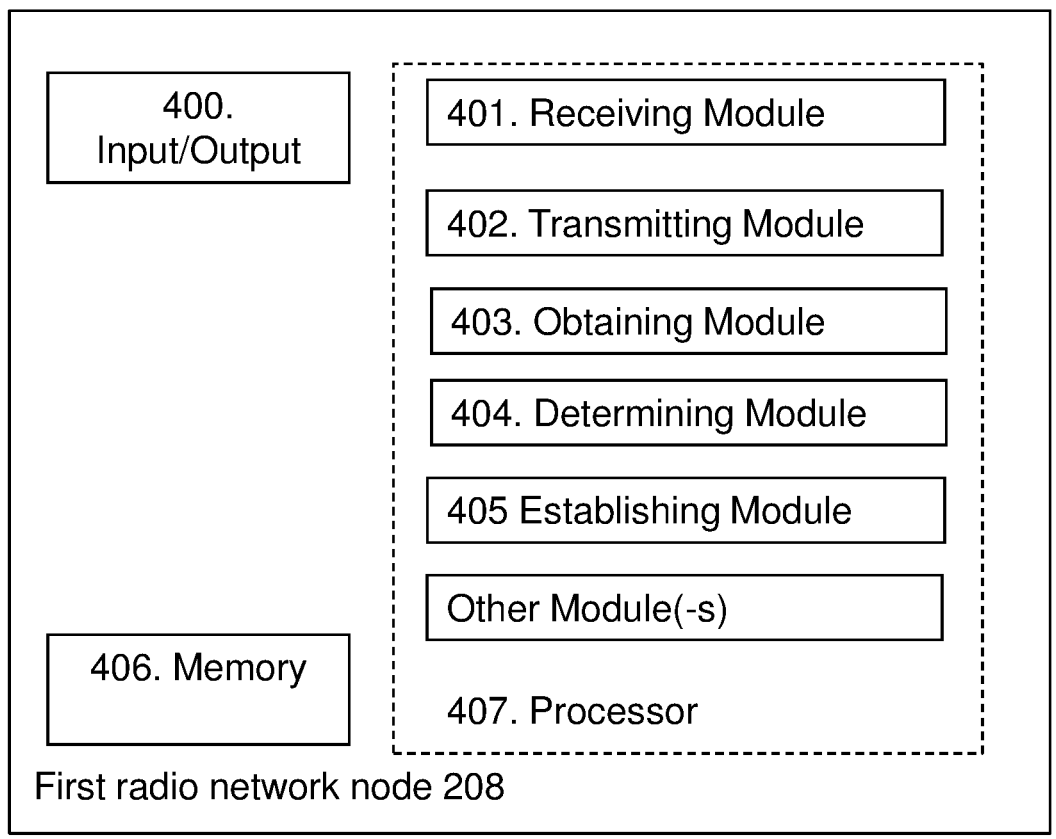
FIG. 4 is a schematic block diagram illustrating embodiments of a first radio network node.

To perform the method for establishing a communications interface between the first radio network node and the second radio network node 210, the first radio network node 208 may be configured according to an arrangement depicted in FIG. 4. As previously mentioned, the second radio network node 210 may be an gNB lacking a control plane connectivity to the first core network node 204. As mentioned above, the first radio network node 208 and the second radio network node 210 are configured to operate in the wireless communications network 200.

In some embodiments, the first radio network node 208 comprises an input and/or output interface 400 configured to communicate with one or more wireless devices, e.g. the wireless device 212, one or more radio network nodes, e.g. one or more other first radio network nodes 208 and/or one or more second network nodes, e.g. the second radio network node 210, and/or one or more core network nodes, e.g. the first core network node 204 and/or the second core network node 206. The input and/or output interface 400 may comprise a wireless receiver (not shown) and a wireless transmitter (not shown).

The first radio network node 208 is configured to receive, by means of a receiving module 401 configured to receive, a transmission, e.g. a data packet, a signal or information, from one or more radio network nodes, e.g. from one or more other first radio network nodes 208 and/or one or more second network nodes, e.g. the second radio network node 210, one or more wireless devices, e.g. the wireless device 212, and/or one or more core network nodes, e.g. the first core network node 204 and/or the second core network node 206. The receiving module 401 may be implemented by or arranged in communication with a processor 407 of the first radio network node 208. The processor 407 will be described in more detail below.

The first radio network node 208 is configured to receive the TNL address of the second radio network node 210.

In some embodiments, the first radio network node 208 is configured to receive the TNL address of the second radio network node 210 from the first core network node 204 configured to operate in the wireless communications network 200. As previously mentioned, this may relate to the first exemplifying approach that will be described below.

In some embodiments, the first radio network node 208 is configured to receive the TNL address of the second radio network node 210 from another first radio network node 208 acting as a proxy node in the wireless communications network 200. As previously mentioned, this may relate to the second exemplifying approach that will be described below.

In some embodiments, the first radio network node 208 is configured to receive the TNL address of the second radio network node 210 from one out of the first core network node 204 and a second core network node 206. As previously mentioned, this may relate to the third exemplifying approach that will be described below.

In some embodiments, the first radio network node 208 is configured to receive from the wireless device 212, the broadcasted TNL address of the second radio network node 210. As previously mentioned, this may relate to the fourth exemplifying approach that will be described below.

In some embodiments, the first radio network node 208 is configured to receive from the wireless device 212, information relating to a cell identity and a node identity of the second radio network node 210. As previously mentioned, this may be the case when the first radio network node 208 has transmitted, to the wireless device 212 operating in the communications network 200 and being served by the first radio network node 208, the request to report information relating to the cell identity and the node identity of the second radio network node 210 as described in Action 304 above. Thus, this may relate to the fifth exemplifying approach that will be described below. In such embodiments, the first radio network node 208 determines, based on the received information, the TNL address of the second radio network node 210.

The first radio network node 208 is configured to transmit, by means of a transmitting module 402 configured to transmit, a transmission, e.g. a data packet, a signal or information, to one or more radio network nodes, e.g. to one or more other first radio network nodes 208 and/or one or more second network nodes, e.g. the second radio network node 210, one or more wireless devices, e.g. the wireless device 212, and/or one or more core network nodes, e.g. the first core network node 204 and/or the second core network node 206. The transmitting module 402 may be implemented by or arranged in communication with the processor 407 of the first radio network node 208.

The first radio network node 208 may be configured to transmit a request for the TNL address of the second radio network node 210.

In some embodiments, the first radio network node 208 is configured to transmit, to the first core network node 204, a request for the TNL address of the second radio network node 210 having a communications interface to the first core network node 204. As previously mentioned, this may relate to the first exemplifying approach that will be described below.

In some embodiments, the first radio network node 208 is configured to transmit, to another first radio network node 208 acting as a proxy node in the wireless communications network 200, a request for the TNL address of the second radio network node 210. As previously mentioned, this may relate to the second exemplifying approach that will be described below.

In some embodiments, the first network node 208 is configured to transmit the request for the TNL address of the second radio network node 210 to the first core network node 204 via an inter-CN-inter-system interface. This may relate to the third exemplifying approach that will be described below.

In some embodiments, the first radio network node 208 is configured to transmit, to a wireless device 212 operating in the communications network 200 and being served by the first radio network node 208, a request to relay a TNL address being broadcasted by the second radio network node 210. As previously mentioned, this may relate to the fourth exemplifying approach that will be described below.

In some embodiments, the first radio network node 208 is configured to transmit, to a wireless device 212 operating in the communications network 200 and being served by the first radio network node 208, a request to report information relating to a cell identity and a node identity of the second radio network node 210. As previously mentioned, this may relate to the fifth exemplifying approach that will be described below.

The first radio network node 208 may be configured to obtain, by means of an obtaining module 403 configured to obtain, the TNL address of the second radio network node 210. The obtaining module 403 may be implemented by or arranged in communication with the processor 407 of the first radio network node 208.

As mentioned above, the first radio network node 208 may be configured to obtain the TNL address of the second radio network node 201 by receiving from one out of: the first core network node 204 and the another first radio network node 208. Further, as also previously mentioned, the radio network node 208 may be configured to obtain the TNL address by receiving it from the wireless device 212. Furthermore, and as also previously mentioned, the radio network node 208 may be configured to obtain the TNL address by determining based on received information relating to a cell identity and a node identity.

The first radio network node 208 may be configured to determine, by means of a determining module 404 configured to determine, the TNL address of the second radio network node 210. The determining module 404 may be implemented by or arranged in communication with the processor 407 of the first radio network node 208.

The first radio network node 208 may be configured to determine the TNL address of the second radio network node 210 based on received information relating to a cell identity and a node identity.

The first radio network node 208 is configured to establish, by means of an establishing module 405 configured to establish, a communication interface between the first and the second radio network nodes 208, 210. The establishing module 405 may be implemented by or arranged in communication with the processor 407 of the first radio network node 208.

The first network node 208 may be configured to establish the communications interface based on the obtained TNL address of the second radio network node 210. Thereby, a connectivity between the first radio network node 208 providing E-UTRA resources and the second radio network node 210 providing NR resources is established. Thus, the communications interface enables direct communication between the first radio network node 208 and the second radio network node 210.

The communication interface may be an Xx-C interface, As previously mentioned, a reference to an "Xx interface", "Xx address" and similar should not be construed limiting but to refer or relate to an interface between two radio network nodes, e.g. between the first and second radio network nodes 208, 210. It should also be understood that the expression X2-C interface may be used instead of Xx-C interface.

In some embodiments, the first radio network node 208 is configured to perform, by means of one or more other modules configured to perform one or more further actions described herein. The one or more other modules may be implemented by or arranged in communication with the processor 407 of the first radio network node 208.

The first radio network node 208 may also comprise means for storing data. In some embodiments, the first radio network node 208 comprises a memory 406 configured to store the data. The data may be processed or non-processed data and/or information relating thereto. The memory 406 may comprise one or more memory units. Further, the memory 406 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the first radio network node 208.

Embodiments herein for establishing a communications interface between the first radio network node 108 and the second radio network node 210 may be implemented through one or more processors, such as the processor 407 in the arrangement depicted in FIG. 4, together with computer program code for performing the functions and/or method actions of embodiments herein. The program code mentioned above may also be provided as a computer program product, for instance in the form of a data carrier carrying computer program code for performing the embodiments herein when being loaded into first radio network node 208. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the first radio network node 208.

Those skilled in the art will also appreciate that the input/output interface 400, the receiving module 401, the transmitting module 402, the obtaining module 403, determining module 404, the establishing module 405, and the one or more other modules above may refer to a combination of analogue and digital circuits, and/or one or more processors configured with software and/or firmware, e.g. stored in the memory 406, that when executed by the one or more processors such as the processors in the first radio network node 208 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

An example of a method performed by the second radio network node 208 for providing its TNL address to a first radio network node 208 to enable establishment of a communications interface between the first radio network node 208 and the second radio network node 210 will now be described with reference to a flowchart depicted in FIG. 5. As previously mentioned, the first radio network node 208 is configured to provide one or more E-UTRA resources and the second radio network node 210 is configured to provide one or more NR resources. The second radio network node 210 may be a gNB lacking a control plane connectivity to the first core network node 204 operating in the wireless communications network 200. As also mentioned above, the first radio network node 208 and the second radio network node 210 operate in the wireless communications network 200.

The methods comprise one or more of the following actions. Thus, one or more of the following actions may be optional. Further, it should be understood that the actions may be taken in any suitable order and that some actions may be combined.

Action 501

In some embodiments, the second radio network node 210 lacking the control plane connectivity establishes an S1-MME interface to the first core network node 204. Thereby, the second radio network node 210 will have a control plane connectivity with the first core network node 204.

The second radio network node 210 may establish the S1-MME interface to the first core network node 204 by initiating a Stream Control Transmission Protocol (SCTP) association procedure and issuing/initialising an S1-MME procedure to set up the S1-MME interface. This may relate to the first exemplifying approach that will be described in more detail below.

In some embodiments, the second radio network node 210 establishes an Xx-C interface to another first radio network node 208 acting as a proxy node in the wireless communications network 200, wherein the another first radio network node 208 is configured to provide one or more E-UTRA resources. This may relate to the second exemplifying approach that will be described in more detail below.

In some embodiments, the second radio network node 210 establishes an inter-CN-inter-system interface to the first core network node 204. This may relate to the third exemplifying approach that will be described in more detail below.

Action 502

In some embodiments, the second radio network node 210 receives, from the first core network node 204, a request for its TNL address. This may relate to the first exemplifying approach that will be described in more detail below.

Action 503

The second radio network node 210 provides an TNL address to one out of: the first core network node 204 operating in the wireless communications network 200 and another first radio network node 208 acting as a proxy node in the wireless communications network 200.

In some embodiments, the second radio network node 210 provides the TNL address by transmitting the TNL address to the first core network node 204. This may be performed over the communications interface, e.g. the S1-MME interface, established in Action 501 above and may relate to the first exemplifying approach that will be described in more detail below.

In some embodiments, the second radio network node 210 provides the TNL address by transmitting the TNL address to the another first radio network node 208 acting as the proxy node over the Xx-C interface established as described in Action 501 above. This may relate to the second exemplifying approach that will be described in more detail below.

In some embodiments, the second radio network node 210 provides the TNL address by transmitting the TNL address to the first core network node 204 over the inter-CN-inter system interface established to the first core network node 204 as described in Action 501 above. This may relate to the third exemplifying approach that will be described in more detail below.

In some embodiments, the second radio network node 210 provides the TNL address by broadcasting the TNL address. This may relate to the fourth exemplifying approach that will be described in more detailed below.

In some embodiments, the second radio network node 210 provides the TNL address by transmitting information relating to a cell identity and a node identity of the second radio network node 210, wherein the cell identity and the node identity provides the TNL address of the second radio network node 210. This may relate to the fifth exemplifying approach that will be described in more detail below.

To perform the method for providing a TNL address of the second radio network node 210 to enable establishment of a communications interface between the first radio network node 208 and the second radio network node 210, the second radio network node 210 may be configured according to an arrangement depicted in FIG. 6. As previously mentioned, the first radio network node 208 is configured to provide one or more E-UTRA resources and the second radio network node 210 is configured to provide one or more NR resources. As also previously mentioned, the second radio network node 210 may be a gNB lacking a control plane connectivity to the first core network node 204. Further, the first radio network node 208 and the second radio network node 210 are configured to operate in the wireless communications network 200.

In some embodiments, the second radio network node 210 comprises an input and/or output interface 600 configured to communicate with one or more wireless devices, e.g. the wireless device 212, one or more radio network nodes, e.g. one or more first radio network nodes 208 and/or one or more other second network nodes 210, and/or one or more core network nodes, e.g. the first core network node 204 and/or the second core network node 206. The input and/or output interface 600 may comprise a wireless receiver (not shown) and a wireless transmitter (not shown).

The second radio network node 210 is configured to receive, by means of a receiving module 601 configured to receive, a transmission, e.g. a data packet, a signal or information, from one or more radio network nodes, e.g. from one or more first radio network nodes 208 and/or one or more other second network nodes 210, one or more wireless devices, e.g. the wireless device 212, and/or one or more core network nodes, e.g. the first core network node 204 and/or the second core network node 206. The receiving module 601 may be implemented by or arranged in communication with a processor 606 of the second radio network node 210. The processor 607 will be described in more detail below.

In some embodiments, the second radio network node 210 is configured to receive, from the first core network node 204, a request for its TNL address. As previously mentioned, this may relate to the first or third exemplifying approach which will be described in more detail below.

The second radio network node 210 is configured to transmit, by means of a transmitting module 602 configured to transmit, a transmission, e.g. a data packet, a signal or information, to one or more radio network nodes, e.g. to one or more first radio network nodes 208 and/or one or more other second network nodes 210, one or more wireless devices, e.g. the wireless device 212, and/or one or more core network nodes, e.g. the first core network node 204 and/or the second core network node 206. The transmitting module 602 may be implemented by or arranged in communication with the processor 606 of the second radio network node 210.

In some embodiments, the second radio network node 210 is configured to transmit the TNL address to the first core network node 204 over a communications interface established to the first core network node 204. As previously mentioned this may relate to the first exemplifying approach that will be described below.

In some embodiments, the second radio network node 210 is configured to transmit the TNL address to another first radio network node 208 acting as a proxy node. This may be done over an Xx-C interface established to the another first radio network node 208. As previously mentioned this may relate to the second exemplifying approach that will be described below.

In some embodiments, the second radio network node 210 is configured to transmit the TNL address to the first core network node 204 over an inter-CN-inter-system interface established to the first core network node 204. As previously mentioned this may relate to the third exemplifying approach that will be described below.

The second radio network node 210 is configured to establish, by means of an establishing module 603 configured to establish, a communication interface between the first and the second radio network nodes 208, 210, and/or between the second radio network node 210 and a core network node, e.g. the first core network node 204 and/or the second core network node 206. The establishing module 603 may be implemented by or arranged in communication with the processor 606 of the second radio network node 210.

In some embodiments, the second radio network node 210 is configured to establish an S1-MME interface to the first core network node 204. The second radio network node 210 may be configured to establish the S1-MME interface to the first core network node 204 by initiating a Stream Control Transmission Protocol (SCTP) association procedure and issuing/initialising an S1-MME procedure to set up the S1-MME interface. As previously mentioned, this may relate to the first exemplifying approach that will be described in more detailed below.

In some embodiments and as previously described, the second radio network node 210 is configured to establish an Xx-C interface to the another first radio network node 208. As previously mentioned this may relate to the second exemplifying approach that will be described below.

In some embodiments and as previously described, the second radio network node 210 is configured to establish an inter-CN-inter-system interface to the first core network node 204. As previously mentioned this may relate to the third exemplifying approach that will be described below.

The second radio network node 210 may be configured to provide, by means of a providing module 604 configured to provide, the TNL address of the second radio network node 210. The providing module 604 may be implemented by or arranged in communication with the processor 606 of the second radio network node 210.

The second radio network node 210 is configured to provide an TNL address.

In some embodiments, the second radio network node 210 is configured to provide the TNL address by transmitting the TNL address to the first core network node 204. This may relate to the first or third exemplifying approach that will be described in more detail below.

In some embodiments, the second radio network node 210 is configured to provide the TNL address by transmitting the TNL address to the another first radio network node 208. As previously mentioned, this may relate to the second exemplifying approach that will be described in more detail below.

In some embodiments, the second radio network node 210 is configured to provide the TNL address by broadcasting the TNL address. As previously mentioned, this may relate to the fourth exemplifying approach that will be described in more detail below.

In some embodiments, the second radio network node 210 is configured to provide the TNL address by transmitting information relating to a cell identity and a node identity of the second radio network node 210, wherein the cell identity and the node identity provides the TNL address of the second radio network node 210. As previously mentioned, this may relate to the fifth exemplifying approach that will be described in more detailed below.

In some embodiments, the first radio network node 208 is configured to perform, by means of one or more other modules configured to perform one or more further actions described herein. The one or more other modules may be implemented by or arranged in communication with the processor 606 of the second radio network node 210.

The second radio network node 210 may also comprise means for storing data. In some embodiments, the second radio network node 210 comprises a memory 605 configured to store the data. The data may be processed or non-processed data and/or information relating thereto. The memory 605 may comprise one or more memory units. Further, the memory 605 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the second radio network node 210.

Embodiments herein for providing a TNL address of the second radio network node 210 to enable establishment of a communications interface between the first radio network node 208 and the second radio network node 210 may be implemented through one or more processors, such as the processor 606 in the arrangement depicted in FIG. 6, together with computer program code for performing the functions and/or method actions of embodiments herein. The program code mentioned above may also be provided as a computer program product, for instance in the form of a data carrier carrying computer program code for performing the embodiments herein when being loaded into the second radio network node 210. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the second radio network node 210.

Those skilled in the art will also appreciate that the input/output interface 600, the receiving module 601, the transmitting module 602, the establishing module 603, the providing module 604, and the one or more other modules above may refer to a combination of analogue and digital circuits, and/or one or more processors configured with software and/or firmware, e.g. stored in the memory 605, that when executed by the one or more processors such as the processors in the second radio network node 210 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Some embodiments disclosed herein are based on or comprise one or more of the following exemplifying approaches. The approaches relate to the discovery of a TNL address of a radio network node, e.g. the second radio network node 210, and to the establishment of an interface between two radio network nodes, e.g. between the first and second radio network nodes 208, 210. Thus, the examples given below relate to the actions and features previously described. Sometimes in the description below reference is made to an MME as the first core network node 204. However, as previously mentioned the first core network node 204 may be an AMF. Thus, it should be understood that the description below is equally applicable to embodiments wherein the first core network node 204 is an AMF.

A First Exemplifying Approach

In the first exemplifying approach, the second radio network node 210, e.g. the gNB, may setup a communication interface, e.g. an S1-MME interface or an AMF interface, to the first core network node 204 by initiating a Stream Control Transmission Protocol (SCTP) association and by issuing an S1-MME procedure to setup the S1-MME interface instance.

The SCTP is a reliable transport layer protocol defined by the Internet Engineering Task Force (IETF) and operates on top of a connectionless packet network such as Internet Protocol (IP). The SCTP ensures reliable, non-duplicated message delivery. In addition it may handle multiple streams and is tolerant of network-level faults through support of multi-homing. The design of SCTP also comprises congestion avoidance and resistance to flooding and masquerade attacks.

The respective S1-MME protocol function is either added on top of the existing S1 Setup procedure or defined as a new function but similar to the existing S1 Setup procedure. Such an S1 Setup protocol function setting up the S1-MME interface between the second radio network node 210, e.g. the gNB, and the first core network node 204, e.g. the MME, is expected to also be very similar to the setup procedure between the first radio network node 208, e.g. a 5G RAN node, and the 5G core network 202, e.g. to an Authentication and Mobility Function (AMF).

Further, such an S1 Setup procedure between the second radio network node 210, e.g. the gNB, and the first core network node 204, e.g. the MME, may have to take into account that the second radio network node's, e.g. the gNB's, node identifier is different from the first radio network node's, e.g. the LTE eNB's, node identifier. Further, the second radio network node's node identifier is derived from an NR cell identifier and the first radio network node's node identifier is derived from an E-UTRA cell identifier. Alternatively, if no new NR node specific addressing space is introduced, the legacy eNB addressing space is used. The legacy eNB addressing space is sometimes herein referred to as an RAN node addressing space. However, a drawback of such an approach is that it consumes the RAN node addressing space, i.e. it is limited by the existing 4G deployments.

Once the S1-MME interface has been setup and the first radio network node 208, e.g. the LTE eNB, is able to retrieve the Xx-C TNL address from the second radio network node 210, e.g. the gNB, the Xx-C interface instance may be setup by the first radio network node 208, e.g. the LTE eNB. For example, the first radio network node 208 may retrieve or receive the TNL address indirectly from the second radio network node 210 via the first core network node 204. The respective Xx-C Setup signaling between the first radio network node 208, e.g. the LTE eNB, and the second radio network node 210, e.g. the gNB, will comprise NR cell information from the second radio network node 210, e.g. the gNB, and E-UTRA cell information from the first radio network node 208, e.g. the LTE eNB.

Retrieval of the Xx-C TNL address may be performed via the SON configuration Transfer procedures already existing in LTE, by which the first radio network node 208, e.g. a source RAN node such as an eNB, may request the Xx TNL address by sending a message to the connected MME 204. The MME 204 may then forward such request to the second radio network node 210, e.g. a target node such as a gNB, with which an Xx interface needs to be established. In return the second radio network node 210, such as the target node, e.g. the gNB, would reply with the Xx TNL address information via a new message sent to the connected MME 204. The MME 204 will forward the Xx-C TNL address to the first radio network node 208, e.g. the source node such as the eNB. The current S1 messages used for such procedures are the eNB Configuration Transfer and MME Configuration Transfer messages. The same messages may be used for this case, or alternatively one or more new messages may be defined. Based on the TNL address of the second radio network node 210, the first radio network node 208 may establish a communications interface, e.g. an Xx-C interface, between the first and second radio network nodes 208, 210.

The first exemplifying approach relates to e.g. Actions 301, 305, 306, 501, 502, and 503 previously described.

A Second Exemplifying Approach

In the second exemplifying approach, where another first radio network node 208, e.g. an LTE eNB, serves as a proxy node between the first radio network node 208 and towards the MME 204, the second radio network node 210, e.g. the gNB, may need to be configured with the another first radio network node's, e.g. the LTE eNB's, Xx-C TNL address towards which it may setup an Xx-C interface once the second radio network node 210, e.g. the gNB, has started its operation. Such an approach may not be very well scalable, as the another first radio network node 208 acting as a proxy LTE eNB may need to provide higher Xx-C connectivity than other first radio network nodes not acting as a proxy LTE eNB but just acting as an LTE eNB. Further, such another first radio network node 208, e.g. a proxy LTE eNB, may not necessarily be a real neighbour node of the second radio network node 210, e.g. the gNB, but the another first radio network node 208 may serve as a proxy, i.e. a proxy node, for a larger region. More than one another first radio network node 208 acting as a proxy may be instantiated for redundancy reasons. If the primary proxy node fails, the second radio network node 210, e.g. the gNB, may setup an Xx-C interface instance to a backup proxy node.

The another first radio network node 208 acting as a proxy node may need to announce the one or more second radio network nodes', e.g. one or more gNBs', IDs to which it connects to the one or more MMEs 204 it is connected to in order to allow other first radio network nodes 208, e.g. other LTE eNBs, to perform TNL address discovery of the one or more second radio network nodes 210, e.g. of the one or more gNBs. Requests from other first radio network nodes 208, e.g. other LTE eNBs, to provide Xx-C TNL addresses may then be relayed by the responsible proxy node to the requested second radio network nodes, e.g. the gNBs. This relates to Action 302 previously described, and as described in Action 305, the first radio network node 208 may receive the TNL address of the second radio network node 210 from the another first radio network node 208 acting as the proxy node. Based on the TNL address of the second radio network node 210, the first radio network node 208 may establish a communications interface, e.g. an Xx-C interface, between the first and second radio network nodes 208, 210. Further, the second exemplifying approach relates to e.g. Actions 306, 501 and 503 previously described.

A Third Exemplifying Approach

In the third exemplifying approach, the first radio network node 208, e.g. the LTE eNB, initiates the TNL address discovery via the inter-CN-inter-system interface. For example, this may be the case when the core network 202 comprises at least two core networks such as a NR/5G core network and an LTE core network. The responsible 5G CN node, e.g. one of the first and second core network nodes 204, 206, to which the second radio network node 210, e.g. the NR node such as the gNB, may have Setup an RAN-CN interface instance, may relay the TNL address discovery request to the second radio network node 210, e.g. the NR node. Thereby, the second radio network node 210 may provide a specific Xx-C TNL address back to the first radio network node 208, e.g. the LTE eNB. For example, the second radio network node 210 may provide the TNL address indirectly to the first radio network node 208 via the first core network node 204. Based on the TNL address, e.g. the Xx-C TNL address, of the second radio network node 210, the first radio network node 208 may establish a communications interface, e.g. an Xx-C interface, between the first and second radio network nodes 208, 210.

Assuming inter-system mobility between the EPS, e.g. the LTE communications system, and the 5G communications system is possible, one may assume the ability of the overall system to route such an TNL address discovery request based on RAN node identifiers, probably aided by CN area identifiers, e.g. tracking area identifiers. Such an approach is expanding a bit the concept of option 3, wherein in theory the second radio network node 210, e.g. the gNB, has no connection to the 5G CN, to migration scenarios where option 3 is still deployed, but where there is already the possibility of connecting to the first core network node 204, e.g. an AMF or equivalent node (not offering the full functionality of a 5G CN for example), and then the second radio network node 210, e.g. the gNB, may be able to execute TNL address discovery via such an interface, but not other functionality.

The third exemplifying approach relates to e.g. Actions 301, 305, 306, 501, and 503 previously described.

A Fourth Exemplifying Approach

In the fourth exemplifying approach the second radio network node 210, e.g. the gNB, may broadcast its Xx-C TNL address over the air, in a way that may be encrypted with encryption keys only known to one or more selected first radio network nodes 208, e.g. one or more RAN nodes such as one or more eNBs, in the neighbourhood. A wireless device 212, e.g. a UE, may be able to read the broadcast information, but it may not be able to decrypt it. This may ensure that the Xx-C TNL address is not visible to the wireless device 212. The wireless device 212 may be able to report the encrypted address to the first radio network node 208, e.g. a neighbour RAN node, such as an eNB, which is serving the wireless device 212 and that has requested the wireless device 212 to measure and report such information. The first radio network node 208, e.g. the neighbour RAN node, in virtue of the fact of being in possession of the decryption key, may decrypt the Xx-C TNL address and may trigger an Xx-C Setup procedure to the neighbour address, e.g. to the second radio network node 210 such as the gNB. Thereby, setting up the Xx-C interface between the first and second radio network nodes 208, 210.

Note that the decryption key may be acquired in several ways, for example via an OAM configuration.

The fourth exemplifying approach relates to e.g. Actions 303, 305, 306, 501, and 503 previously described.

A Fifth Exemplifying Approach

In the fifth exemplifying approach, the first radio network node 208, e.g. a RAN node such as an eNB, neighbouring the second radio network node 210, e.g. the gNB, with which an Xx-C interface needs to be setup may serve one or more wireless devices 212, e.g. one or more UEs, that are able to read system information of such gNB cells. The first radio network node 208, e.g. the serving node, may request the UEs to report read system information, e.g. the cell information for the second radio network node 210, e.g. the neighbour gNB, such as cell identifiers and node identifiers. The first radio network node 208, e.g. the serving eNB, may retrieve information from a database. For example, the first radio network node 208 may contact a local database and send to such database the identifiers reported by the serving UEs for the second radio network node 210, e.g. the neighbour gNB. The local database may be able to map the identifiers to an Xx-C TNL address and to return the Xx-C TNL address to the first radio network node, e.g. the eNB. The first radio network node 208, e.g. the eNB, may then be able to trigger an Xx-C Setup procedure towards the received Xx-C TNL address. Thereby, setting up the Xx-C interface between the first and second radio network nodes 208, 210.

The fifth exemplifying approach relates to e.g. Actions 304, 305, 306, 501, and 503 previously described.

| ABBREVIATION | EXPLANATION |
| --- | --- |
| AMF | Authentication and Mobility Function |
| ANR | Automatic Neighbour Relation |
| CN | Core Network |
| CP | Control Plane |
| EPS | Evolved Packet System |
| gNB | 5G RAN logical node |
| MME | Mobility Management Entity |
| MSB | Most Significant Bit |
| RAN | Radio Access Network |
| S-GW | Serving Gateway |
| TNL | Transport Network Layer |

EXEMPLIFYING EMBODIMENTS

Embodiment 1. A method performed by a first radio network node (208) for discovery of a Transport Network Layer, TNL, address of a second radio network node (210) lacking a control plane connectivity to a first core network node (204), wherein the first radio network node (208), the second radio network node (210) and the first core network node (204) are operating in a wireless communications network (200); and wherein the method comprises:

obtaining (305) an TNL address of the second radio network node (210).

Embodiment 2. The method of embodiment 1, comprising:

transmitting (301), to the first core network node (204), a request for the TNL address of the second radio network node (210) having established a communications interface to the first core network node (204); and wherein the obtaining (305) of the TNL address comprises:

receiving, from the first core network node (204), the TNL address of the second radio network node (210).

Embodiment 3. The method of embodiment 1, comprising:

transmitting (302), to another first radio network node (208) acting as a proxy node, a request for the TNL address of the second radio network node (210); and wherein the obtaining (305) of the TNL address comprises:

receiving, from the another first radio network node (208) acting as the proxy node, the TNL address of the second radio network node (210).

Embodiment 4. The method of embodiment 1, wherein the obtaining (305) of the TNL address comprises:

receiving, from one out of the first core network node (204) and a second core network node (206), the TNL address of the second radio network node (210).

Embodiment 5. The method of embodiment 1, comprising:

transmitting (303), to a wireless device (212) operating in the communications network (200) and being served by the first radio network node (208), a request to relay a TNL address being broadcasted by the second radio network node (210); and wherein the obtaining (305) of the TNL address comprises:

receiving, from the wireless device (212), the broadcasted TNL address of the second radio network node (210).

Embodiment 6. The method of embodiment 1, comprising:

transmitting (304), to a wireless device (212) operating in the communications network (200) and being served by the first radio network node (208), a request to report information relating to a cell identity and a node identity of the second radio network node (210); and wherein the obtaining (305) of the TNL address comprises:

receiving, from the wireless device (212), information relating to a cell identity and a node identity of the second radio network node (210); and determining, based on the received information, the TNL address of the second radio network node (210).

Embodiment 7. The method of any one of embodiments 1-6, comprising:

establishing (306) a communications interface, e.g. an Xx-C interface, between the first and second radio network nodes (208,210).

Embodiment 8. A method performed by a second radio network node (210) for providing its Transport Network Layer, TNL, address to a first radio network node (208), wherein the second radio network node (210) lacks a control plane connectivity to a first core network node (204), wherein the first radio network node (208), the second radio network node (210) and the first core network node (204) are operating in a wireless communications network (200); and wherein the method comprises:

providing (503) an TNL address.

Embodiment 9. The method of embodiments 8, comprising:

establishing (501) a communications interface, e.g. an S1-MME interface, to the first core network node (204);

receiving (502), from the first core network node (204), a request for its TNL address; and wherein providing (503) the TNL address comprises:

transmitting the TNL address to the first core network node (204).

Embodiment 10. The method of embodiment 9, wherein the establishing (501) of the communications interface, e.g. the S1-MME interface, to the first core network node (204) comprises:

initiating a Stream Control Transmission Protocol, SCTP, association procedure and issuing/initialising an S1-MME procedure to set up the S1-MME interface.

Embodiment 11. The method of embodiments 8, wherein providing (503) the TNL address comprises:

broadcasting the TNL address.

Embodiment 12. The method of embodiments 8, wherein providing (503) the TNL address comprises:

transmitting information relating to a cell identity and a node identity of the second radio network node (210), wherein the cell identity and the node identity provides the TNL address of the second radio network node (210).

Some Further Numbered Example Embodiments

Embodiment US1. A first radio network node (208) for establishing a communications interface between the first radio network node (208) and a second radio network node (210), wherein the first radio network node (208) is configured to provide one or more Evolved Universal Terrestrial Radio Access, E-UTRA, resources and the second radio network node (210) is configured to provide one or more New Radio, NR, resources, wherein the first and second radio network nodes (208,210) are configured to operate in a wireless communications network (200); and wherein the first radio network node (208) comprises a processor and a memory, said memory comprising instructions executable by said processor whereby the first radio network node (208) is operative to:

obtain a Transport Network Layer, TNL, address of the second radio network node (210) from one out of:
  a first core network node (204) configured to operate in the wireless communications network (200); and
  another first radio network node (208) configured to act as a proxy node in the wireless communications network (200), wherein the another first radio network node (208) is configured to provide one or more E-UTRA resources; and
establish a communications interface between the first radio network node (208) and the second radio network node (210) based on the obtained TNL address.

Embodiment US2. The first radio network node (208) of embodiment US1, wherein a node identifier of the second radio network node (210) is different from a node identifier of the first radio network node (208).

Embodiment US3. The first radio network node (208) of embodiment US2, wherein the node identifier of the second radio network node (210) is derived from a NR cell identifier and the node identifier of the first radio network node (208) is derived from an E-UTRA cell identifier.

Embodiment US4. The first radio network node (208) of any one of embodiments US1-3, further being operative to:

transmit, to the first core network node (204), a request for the TNL address of the second radio network node (210) having a communications interface to the first core network node (204), and wherein the first radio network node (208) is configured to obtain the TNL address by being configured to:

receive, from the first core network node (204), the TNL address of the second radio network node (210).

Embodiment US5. The first radio network node (208) of embodiment US1, further being operative to:

transmit, to the another first radio network node (208) acting as the proxy node, a request for the TNL address of the second radio network node (210) and wherein the first radio network node (208) is operative to obtain the TNL address by being operative to:

receive, from the another first radio network node (208) acting as the proxy node, the TNL address of the second radio network node (210).

Embodiment US6. The first radio network node (208) of embodiment US1, further being operative to:

transmit, via an inter-Core Network, CN,-inter-system interface, to the first core network node (204), a request for the TNL address of the second radio network node (210); and wherein the first radio network node (208) is operative to obtain the TNL address by being operative to:

receive, from the first core network node (204), the TNL address of the second radio network node (210).

Embodiment US7. The first radio network node (208) of any one of embodiments US1-6, wherein the communications interface is an Xx-C interface.

Embodiment US8. A second radio network node (210) for providing its Transport Network Layer, TNL, address to enable establishment of a communications interface between a first radio network node (208) and the second radio network node (210), wherein the first radio network node (208) is configured to provide one or more Evolved Universal Terrestrial Radio Access, E-UTRA, resources and the second radio network node (210) is configured to provide one or more New Radio, NR, resources, wherein the first radio network node (208) and the second radio network node (210) are configured to operate in a wireless communications network (200); and wherein the second radio network node (210) comprises a processor and a memory, said memory comprising instructions executable by said processor whereby the second radio network node (210) is operative to:

provide an TNL address to one out of:
    a first core network node (204) configured to operate in the wireless communications network (200); and
    another first radio network node (208) configured to act as a proxy node in the wireless communications network (200), wherein the another first radio network node (208) is configured to provide one or more E-UTRA resources.

Embodiment US9. The second radio network node (210) of embodiment US8, further being operative to:

establish a communications interface to the first core network node (204);

receive, from the first core network node (204), a request for its TNL address; and wherein the second radio network node (210) is operative to provide the TNL address by being operative to:

transmit, over the communications interface, the TNL address to the first core network node (204).

Embodiment US10. The second radio network node (210) of embodiment US9, wherein the second radio network node (210) is operative to establish the communications interface to the first core network node (204) by being operative to:

initiate a Stream Control Transmission Protocol, SCTP, association procedure and initiate an S1-MME procedure to set up an S1-MME interface.

Embodiment US11. The second radio network node (210) of embodiment US8, further being operative to:

establish an Xx-C interface to the second first radio network node (208) acting as the proxy node; and wherein the second radio network node (210) is operative to provide the TNL address by being operative to:

transmit, over the Xx-C interface, the TNL address to the second first radio network node (208) acting as the proxy node.

Embodiment US12. The second radio network node (210) of embodiment US8, further being operative to:

establish an inter-Core Network, CN,-inter-system interface to the first core network node (204);

receive, from the first core network node (204), a request for its TNL address; and wherein the second radio network node (210) is operative to provide the TNL address by being operative to:

transmit, over the inter-CN-inter-system interface, the TNL address to the first core network node (204).

Embodiment CN1. A first radio network node (208) for establishing a communications interface between the first radio network node (208) and a second radio network node (210), wherein the first radio network node (208) is configured to provide one or more Evolved Universal Terrestrial Radio Access, E-UTRA, resources and the second radio network node (210) is configured to provide one or more New Radio, NR, resources, wherein the first and second radio network nodes (208,210) are configured to operate in a wireless communications network (200); and wherein the first radio network node (208) comprises:

an obtaining module (403) configured to obtain a Transport Network Layer, TNL, address of the second radio network node (210) from one out of:
    a first core network node (204) configured to operate in the wireless communications network (200); and
    another first radio network node (208) configured to act as a proxy node in the wireless communications network (200), wherein the another first radio network node (208) is configured to provide one or more E-UTRA resources; and an establishing module (405) configured to establish a communications interface between the first radio network node (208) and the second radio network node (210) based on the obtained TNL address.

Embodiment CN2. The first radio network node (208) of embodiment CN1, wherein a node identifier of the second radio network node (210) is different from a node identifier of the first radio network node (208).

Embodiment CN3. The first radio network node (208) of embodiment CN3, wherein the node identifier of the second radio network node (210) is derived from a NR cell identifier and the node identifier of the first radio network node (208) is derived from an E-UTRA cell identifier.

Embodiment CN4. The first radio network node (208) of any one of embodiments CN1-3, comprising:

a transmitting module (402) configured to transmit, to the first core network node (204), a request for the TNL address of the second radio network node (210) having a communications interface to the first core network node (204), and wherein the first radio network node (208) is configured to obtain the TNL address by being configured to comprise:

a receiving module (401) configured to receive, from the first core network node (204), the TNL address of the second radio network node (210).

Embodiment CN5. The first radio network node (208) of claim embodiment CN1, comprising:

a transmitting module (402) configured to transmit, to the another first radio network node (208) acting as the proxy node, a request for the TNL address of the second radio network node (210) and wherein the first radio network node (208) is configured to obtain the TNL address by being configured to comprise:

a receiving module (401) configured to receive, from the another first radio network node (208) acting as the proxy node, the TNL address of the second radio network node (210).

Embodiment CN6. The first radio network node (208) of embodiment CN1, comprising:
a transmitting module (402) configured to transmit, via an inter-Core Network, CN,-inter-system interface, to the first core network node (204), a request for the TNL address of the second radio network node (210); and wherein the first radio network node (208) is configured to obtain the TNL address by being configured to comprise:
a receiving module (401) configured to receive, from the first core network node (204), the TNL address of the second radio network node (210).

Embodiment CN7. The first radio network node (208) of any one of embodiment CN1-6, wherein the communications interface is an Xx-C interface.

Embodiment CN8. A second radio network node (210) for providing its Transport Network Layer, TNL, address to enable establishment of a communications interface between a first radio network node (208) and the second radio network node (210), wherein the first radio network node (208) is configured to provide one or more Evolved Universal Terrestrial Radio Access, E-UTRA, resources and the second radio network node (210) is configured to provide one or more New Radio, NR, resources, wherein the first radio network node (208) and the second radio network node (210) are configured to operate in a wireless communications network (200); and wherein the second radio network node (210) comprises:
a providing module (604) configured to provide an TNL address to one out of:
 a first core network node (204) configured to operate in the wireless communications network (200); and
 another first radio network node (208) configured to act as a proxy node in the wireless communications network (200), wherein the another first radio network node (208) is configured to provide one or more E-UTRA resources.

Embodiment CN9. The second radio network node (210) of claim 20, comprising:
an establishing module (603) configured to establish a communications interface to the first core network node (204);
a receiving module (601) configured to receive, from the first core network node (204), a request for its TNL address; and wherein the second radio network node (210) is configured to provide the TNL address by being configured to comprise:
a transmitting module (602) configured to transmit, over the communications interface, the TNL address to the first core network node (204).

Embodiment CN10. The second radio network node (210) embodiment CN9, wherein the second radio network node (210) is configured to establish the communications interface to the first core network node (204) by the establishing module (603) being configured to:
initiate a Stream Control Transmission Protocol, SCTP, association procedure and initiate an S1-MME procedure to set up an S1-MME interface.

Embodiment CN11. The second radio network node (210) of embodiment CN8, comprising:
an establishing module (603) configured to establish an Xx-C interface to the second first radio network node (208) acting as the proxy node; and wherein the second radio network node (210) is configured to provide the TNL address by being configured to comprise:
a transmitting module (602) configured to transmit, over the Xx-C interface, the TNL address to the second first radio network node (208) acting as the proxy node.

Embodiment CN12. The second radio network node (210) of embodiment CN8, comprising:
an establishing module (603) configured to establish an inter-Core Network, CN,-inter-system interface to the first core network node (204);
a receiving module (601) configured to receive, from the first core network node (204), a request for its TNL address; and wherein the second radio network node (210) is configured to provide the TNL address by being configured to comprise:
a transmitting module (602) configured to transmit, over the inter-CN-inter-system interface, the TNL address to the first core network node (204).

When the word "comprise" or "comprising" is used in this disclosure it shall be interpreted as non-limiting, i.e. meaning "consist at least of".

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method, performed by a first radio network node (RNN) in a wireless network, to establish a communications interface with a second RNN in the wireless network, the method comprising:
receiving, from a third RNN in the wireless network, a Transport Network Layer (TNL) address associated with the second RNN, wherein:
 the first RNN and the third RNN are configured for wireless communication with wireless devices via an Evolved Universal Terrestrial Radio Access (E-UTRA) radio access technology (RAT), and
 the second RNN is configured for wireless communication with wireless devices via a New Radio (NR) RAT; and
establishing the communications interface with the second RNN based on the TNL address received from the third RNN.

2. The method of claim 1, wherein the third RNN is configured as a proxy node for discovery of TNL addresses associated with a plurality RNNs, in the wireless network, that are configured for wireless communication via the NR RAT.

3. The method of claim 1, wherein the third RNN is configured as a TNL address discovery proxy node for a plurality of RNNs, in the wireless network, that are configured for wireless communication via the E-UTRA RAT.

4. The method of claim 1, wherein the third RNN is one of a plurality of redundant TNL address discovery proxy nodes in the wireless network.

5. The method of claim 1, wherein:
the first RNN has a control plane (CP) connection to a core network,
the second RNN has no CP connection to the core network, and
establishing the communication interface comprises establishing a CP connection between the first RNN and the second RNN.

6. The method of claim 1, further comprising transmitting, to the third RNN, a request for the TNL address of the second RNN, wherein the TNL address is received from the third RNN in response to the request.

7. A method performed by a second radio network node (RNN) in a wireless network, for establishing a communications interface with a first RNN in the wireless network, the method comprising:
establishing a control plane (CP) connection with a third RNN in the wireless network, wherein:
the first RNN and the third RNN are configured for wireless communication with wireless devices via an Evolved Universal Terrestrial Radio Access (E-UTRA) radio access technology (RAT), and
the second RNN is configured for wireless communication with wireless devices via a New Radio (NR) RAT; and
transmitting, to the third RNN over the CP connection, a transport network layer (TNL) address associated with the second RNN; and
establishing the communications interface with the first RNN based on the TNL address transmitted to the third RNN.

8. The method of claim 7, wherein the third RNN is configured as a TNL address discovery proxy node for a plurality of RNNs, in the wireless network, that are configured for wireless communication via the E-UTRA RAT, wherein the plurality includes the second RNN.

9. The method of claim 7, wherein:
the third RNN is one of a plurality of redundant TNL address discovery proxy nodes in the wireless network; and
establishing the CP connection to the third RNN is based on detecting failure of another one of the redundant TNL address discovery proxy nodes.

10. The method of claim 7, further comprising receiving, from the third RNN over the CP interface, a request for the TNL address associated with the second RNN, wherein the TNL address is transmitted in response to the request.

11. The method of claim 7, wherein:
the first RNN has a control plane (CP) connection to a core network,
the second RNN has no CP connection to the core network, and
establishing the communication interface comprises establishing a CP connection between the first RNN and the second RNN.

12. A first radio network node (RNN), in a wireless network, configured to establish a communications interface with a second RNN in the wireless network, wherein the first RNN comprises:
at least one processor; and
at least one memory storing computer-executable instructions that, when executed by the at least one processor, configure the first RNN to:
receive, from a third RNN in the wireless network, a Transport Network Layer (TNL) address associated with the second RNN, wherein:
the first RNN and the third RNN are configured for wireless communication with wireless devices via an Evolved Universal Terrestrial Radio Access (E-UTRA) radio access technology (RAT), and
the second RNN is configured for wireless communication with wireless devices via a New Radio (NR) RAT; and
establish the communications interface with the second RNN based on the TNL address received from the third RNN.

13. The first RNN of claim 12, wherein the third RNN is configured as a proxy node for discovery of TNL addresses associated with a plurality RNNs, in the wireless network, that are configured for wireless communication via the NR RAT.

14. The first RNN of claim 12, wherein:
the third RNN is configured as a TNL address discovery proxy node for a plurality of RNNs, in the wireless network, that are configured for wireless communication via the E-UTRA RAT; and
the third RNN is one of a plurality of redundant TNL address discovery proxy nodes in the wireless network.

15. The first RNN of claim 12, wherein:
the first RNN has a control plane (CP) connection to a core network,
the second RNN has no CP connection to the core network, and
execution of the instructions configures the first RNN to establish the communication interface based on establishing a CP connection between the first RNN and the second RNN.

16. The first RNN of claim 12, wherein:
the at least one memory also stores computer-executable instructions that, when executed by the at least one processor, configure the first RNN to transmit, to the third RNN, a request for the TNL address of the second RNN; and
the TNL address is received from the third RNN in response to the request.

17. A second radio network node (RNN), in a wireless network, configured to establish a communications interface with a first RNN in the wireless network, wherein the second RNN comprises:
at least one processor; and
at least one memory storing computer-executable instructions that, when executed by the at least one processor, configure the second RNN to:
establish a control plane (CP) connection with a third RNN in the wireless network, wherein:
the first RNN and the third RNN are configured for wireless communication with wireless devices via an Evolved Universal Terrestrial Radio Access (E-UTRA) radio access technology (RAT), and
the second RNN is configured for wireless communication with wireless devices via a New Radio (NR) RAT; and
transmit, to the third RNN over the CP connection, a transport network layer (TNL) address associated with the second RNN; and
establish the communications interface with the first RNN based on the TNL address transmitted to the third RNN.

18. The second RNN of claim 17, wherein the third RNN is configured as a TNL address discovery proxy node for a plurality of RNNs, in the wireless network, that are configured for wireless communication via the E-UTRA RAT, wherein the plurality includes the second RNN.

19. The second RNN of claim 17, wherein:
the third RNN is one of a plurality of redundant TNL address discovery proxy nodes in the wireless network; and
execution of the instructions configures the second RNN to establish the CP connection with the third RNN based on detecting failure of another one of the redundant TNL address discovery proxy nodes.

20. The second RNN of claim 17, wherein:
the at least one memory also stores computer-executable instructions that, when executed by the at least one processor, configure the second RNN to receive, from the third RNN over the CP interface, a request for the TNL address associated with the second RNN; and the TNL address is transmitted in response to the request.

21. The second RNN of claim 17, wherein:

the first RNN has a control plane (CP) connection to a core network, the second RNN has no CP connection to the core network, and establishing the communication interface comprises establishing a CP connection between the first RNN and the second RNN.

22. A non-transitory, computer-readable medium storing computer-executable instructions that, when executed by at least one processor, configure the first RNN to perform operations corresponding to the method of claim 1.

23. A non-transitory, computer-readable medium storing computer-executable instructions that, when executed by at least one processor, configure the second RNN to perform operations corresponding to the method of claim 7.

* * * * *